United States Patent Office 3,336,248
Patented Aug. 15, 1967

3,336,248
UREA FORMALDEHYDE-ALPHA CELLULOSE-DIMETHYL SILOXANE POLYMER-MOLDING COMPOSITIONS AND METHOD OF MANUFACTURE
Joseph Thomas Sincavage, Media, and George Suranyi, Ridley Park, Pa., assignors to FMC Corporation, New York, N.Y., a corporation of Delaware
No Drawing. Filed June 29, 1965, Ser. No. 468,133
5 Claims. (Cl. 260—17.3)

This invention relates to alpha-cellulose filled urea-formaldehyde molding compositions, characterized by the fact that moldings made therefrom have much higher torque strengths than moldings made from conventional alpha-cellulose filled urea-formaldehyde molding compositions.

One of the principal uses for urea-formaldehyde molding compositions has been in the field of closures for bottles and the like. In recent years, with the increase in capping speeds possible on newer machinery, there has been pressure on the industry, because closures made from conventional urea-formaldehyde molding compositions have insufficient torque strength to prevent them from occasionally cracking in high speed capping machines. As a result, tougher, though less desirable, thermoplastic molding compositions have to some extent replaced urea-formaldehyde compositions.

We have discovered that torque strengths of alpha-cellulose filled urea-formaldehyde molding compositions can be increased by as much as 100% over conventional compositions. According to the present invention, these improved strengths are obtained by grinding together the resin, alpha-cellulose, and other ingredients (mold lubricant, cure accelerator, stabilizer, and opacifying or coloring material), preferably in a ball mill, in the presence of at least about 0.5%, and preferably from about 0.25 to 0.50%, of a dimethyl siloxane polymer.

We do not know just how or why the addition of the dimethyl siloxane polymer to the formulation produces the improved results. However, closures made from molding compositions made in accordance with the instant invention work very well on the high speed capping machines on which closures made from conventional molding compositions are unsatisfactory.

The urea-formaldehyde resins used in accordance with this invention are the conventional type, made by reacting, in warm to hot water, a mol of urea with from about 1.2 mols to 1.6 mols of formaldehyde, at a pH of about 9.0 to 10.0, until a water solution of methylol urea is formed. This syrupy "B" stage resin solution is blended with alpha-cellulose in a mixer in conventional fashion, to produce a mixture of about 65–78% resin, with the balance alpha-cellulose. The dough is dried essentially moisture free (below 1.0%) and is ground to a powder, most conveniently in a ball mill, with the other ingredients of the molding composition. The powder from the ball mill may be used as such, or it may be compacted by pressing and broken into granules of desired size.

The molding compositions of this invention also generally contain, for every 100 parts by weight of resin plus alpha-cellulose, an acidic cure accelerator, a stabilizer, generally hexamethylenetetramine, a lubricant, and a small amount of opacifying pigment. All of these materials are conventional. Generally, there is present from about 0.10 to 1.0 part by weight of cure accelerator, about one quarter to one part of hexamethylenetetramine for each part of cure accelerator, about 0.1 to 0.5 part of lubricant, and about 0.2 to 2 parts opacifying pigment.

The addition of at least about 0.05% of a dimethyl siloxane polymer to these ingredients, at the stage where they are ground together, yields an improvement in torque strength. As the amount of siloxane polymer increases up to about 0.30%, the torque strength improvement goes up, to about double the original strength. The optimum range seems to be about 0.25 to 0.50% of the composition. Larger amounts do not further improve torque strength, but seem to do no harm—we have used the uneconomic amount of 3% of the composition, with no harmful effects.

The degree of polymerization of the dimethyl siloxane polymer has little effect on its utility in the composition. However, we prefer to use the lower molecular weight products, with viscosities ranging from a few centistokes up to some thousands of centistokes. When polymer viscosity is above about 100,000 centistokes, it becomes difficult to handle, and is therefore not as desirable as the lower viscosity material.

The choice of cure accelerator, stabilizer, mold lubricants and pigments has little effect on the composition; any of the conventional materials may be used, in all conventional amounts. Phthalic anhydride is the most commonly used accelerator, being inexpensive and non-volatile on storage; any of the other conventional accelerators (e.g. benzoic acid, the alkyl p-toluene sulfonates) can also be used. Hexamethylenetetramine is the most commonly used stabilizer. Mold lubricants include the higher fatty acids, their heavy metal soaps, and related compounds such as glyceryl mono-stearate. Titanium dioxide is the most widely used pigment; it is often combined with conventional color pigments, in known manner.

The following specific examples are given without any intention that the invention be limited thereto.

EXAMPLES 1 TO 5 AND A AND B
FOR COMPARISON 600 parts by weight of urea was dissolved in 908 parts by weight of 44% formalin at 77° F., and the pH was adjusted to between 9.0 and 10.0 with triethylamine and formic acid. The temperature was raised to 140° F. and held to a free formaldehyde content of 3.0% (15 to 30 minutes). 429 parts of alpha-cellulose and the aqueous syrup were mixed in a dough mixer at 120° F. for 15 minutes; the mixer was dumped into trays, and dried to a moisture content of under 1%, in a circulating air oven controlled to a dry bulb temperature of 190° F., and a wet bulb temperature of 115° F. This took from 1 to 2 hours on replicated runs.

In some of the runs, the ratio of resin to filler was adjusted, to produce the percentage composition indicated in the column.

The dried resin-filler composite was introduced into a ball mill, adding to each 100 parts by weight thereof:

| | Parts |
|---|---|
| Phthalic anhydride | 0.20 |
| Hexamethylenetetramine | 0.10 |
| Zinc stearate | 0.20 |
| Titanium dioxide | 0.20 |

Indicated amount of 200 centipoise viscosity dimethyl siloxane polymer (Dow Corning #200 fluid)

Closure moldings, 28 mm. short skirt type, were compression molded at 300° F. and 5000 p.s.i. for 45 seconds, and conditioned for 24 hours at about 75° F. Torque strengths were determined on an Owens-Illinois Torque Tester, using ten replicates of each.

The results are indicated in Table I.

TABLE I

| Ex. No. | UF Resin | Alpha-cellulose | Siloxane polymer | Torque strength inch-pounds |
|---|---|---|---|---|
| A | 70 | 30 | | 49.0 |
| 1 | 70 | 30 | 0.15 | 68.7 |
| 2 | 70 | 30 | 0.30 | 89.5 |
| 3 | 70 | 30 | 0.50 | 92.6 |
| B | 74 | 26 | | 45.8 |
| 4 | 74 | 26 | 0.30 | 99.0 |
| 5 | 74 | 26 | 0.50 | 99.5 |

Note that torque strength rises to optimum at about 0.30% siloxane, and is little affected above this amount.

Obviously, examples can be multiplied indefinitely without departing from the scope of our invention as defined in the claims.

We claim:

1. A molding composition which can be molded into closures having high torque strength consisting essentially of 65 to 78 parts by weight of urea-formaldehyde resin and 35 to 22 parts by weight alpha-cellulose with small amounts of cure accelerator, stabilizer, lubricant and opacifier, and at least .05% by weight based on the total composition of a liquid dimethyl siloxane polymer whose viscosity is not above 100,000 centistokes.

2. A molding composition which can be molded into closures having high torque strength consisting essentially of 65 to 78 parts by weight of urea-formaldehyde resin and 35 to 22 parts by weight alpha-cellulose with small amounts of cure accelerator, stabilizer, lubricant and opacifier, and 0.25 to 0.50% by weight based on the total composition of a liquid dimethyl siloxane polymer whose viscosity is not above 100,000 centistokes.

3. A molding composition which can be molded into closures having high torque strength consisting of 65 to 78 parts by weight of urea-formaldehyde resin and 35 to 22 parts by weight alpha-cellulose, 0.10 to 1.0 part by weight of an organic acid cure acclerator which is non-volatile at room temperature, 0.25 to 1.0 part by weight hexamethylenetetramine for each part by weight of cure accelerator, 0.1 to 0.5 part by weight lubricant, and 0.20 to 2 parts by weight opacifying pigment, and 0.25 to 0.50 part by weight of a liquid dimethyl siloxane polymer whose viscosity is not above 100,000 centistokes.

4. The method of improving the torque strength of moldings made from alpha-cellulose filled urea-formaldehyde molding compositions which comprises milling the ingredients of the composition with at least 0.05 part by weight of a liquid dimethyl siloxane polymer whose viscosity is not above 100,000 centistokes, and thereafter molding the product to convert the resin to the insoluble and infusible state.

5. The method of improving the torque strength of moldings made from alpha-cellulose filled urea-formaldehyde molding compositions which comprises milling the ingredients of the composition with 0.25 to 0.50 part by weight of a liquid dimethyl siloxane polymer whose viscosity is not above 100,000 centistokes, and thereafter molding the product to convert the resin to the insoluble and infusible state.

References Cited

UNITED STATES PATENTS 2,571,039  10/1951  Hyde _____ 260—9

WILLIAM H. SHORT, *Primary Examiner.*

E. M. WOODBERRY, *Assistant Examiner.*

UNITED STATES PATENT OFFICE
CERTIFICATE OF CORRECTION

Patent No. 3,336,248                          August 15, 1967

Joseph Thomas Sincavage et al.

It is hereby certified that error appears in the above numbered patent requiring correction and that the said Letters Patent should read as corrected below.

Column 1, line 36, for "0.5%" read -- .05% --; column 4, line 5, after "consisting" insert -- essentially --.

Signed and sealed this 26th day of November 1968.

(SEAL)
Attest:

Edward M. Fletcher, Jr.                      EDWARD J. BRENNER

Attesting Officer                              Commissioner of Patents